United States Patent Office 2,912,446
Patented Nov. 10, 1959

2,912,446

Δ¹,⁴-3,20-DIKETO-11-OXYGENATED-17α-HYDROXY-PREGNADIENES AND 9-FLUORO DERIVATIVES THEREOF

Lewis H. Sarett, Princeton, N.J., assignor to Merck & Co., Inc., Rahway, N.J., a corporation of New Jersey No Drawing. Application January 14, 1955
Serial No. 481,958

3 Claims. (Cl. 260—397.45)

This invention is concerned generally with novel steroid compounds and processes of preparing the same. More particularly, it relates to novel 21-desoxy-retrocortin compounds and to processes of making them. These 21-desoxy-retrocortin compounds have been found to possess cortisone-activity, but differ from cortisone in being substantially free of undesired side effects since they do not possess any appreciable sodium or water retention action. These 21-desoxy-retrocortin compounds are especially effective in the treatment of arthritis and related diseases since they can be administered for their cortisone action without producing the undesirable metabolic effect of edema, which is caused by the sodium and water retention action of cortisone.

These novel 21-desoxy-retrocortin compounds, subject of the present invention, may be chemically represented as follows:

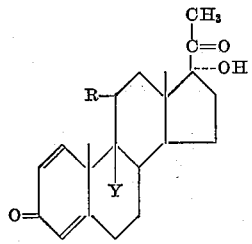

wherein R is a keto or hydroxy radical, and Y is a hydrogen or halogen substituent.

These novel 21-desoxy-retrocortin compounds may be prepared by reacting a retrocortin compound containing a free 21-alcohol grouping with an organic sulfonyl halide compound thereby forming the corresponding retrocortin 21-organic sulfonate compounds, and reacting said retrocortin 21-organic sulfonate compound with an iodide salt to form the corresponding 21-iodo derivative. This latter compound is reacted with a reducing agent to produce the corresponding 21-desoxy-retrocortin compound.

The retrocortin compounds having a free 21-alcohol grouping which are ordinarily employed as starting materials in the hereinabove-mentioned procedure include retrocortin, hydro-retrocortin, 9-halo-retrocortin such as 9-fluoro retrocortin, 9-chloro-retrocortin, 9-halo-hydro-retrocortin compounds such as 9-chloro-hydro-retrocortin, 9-fluoro-hydro-retrocortin, and the like. The reaction between these retrocortin 21-free alcohol compounds and the organic sulfonyl chloride is ordinarily carried out in a solvent comprising a tertiary amine such as pyridine. The organic sulfonyl chloride is ordinarily a lower hydrocarbon sulfonyl chloride, preferably a lower alkyl sulfonyl chloride such as methane sulfonyl chloride, ethane sulfonyl chloride, and the like. The reaction is usually complete in about one to three hours when the temperature is maintained at 0° C. The retrocortin 21-organic sulfonate compound thus obtained is conveniently recovered from the reaction mixture by diluting it with water, and recovering the crystalline material which precipitates. The retrocortin 21-organic sulfonate compounds obtained utilizing the foregoing method include retrocortin 21-methane sulfonate, hydro-retrocortin 21-methane sulfonate, 9-fluoro-retrocortin 21-methane sulfonate, 9-fluoro-hydro-retrocortin 21-methane sulfonate, and the like.

The retrocortin 21-organic sulfonate compound is converted to the corresponding 21-iodo compound by treatment with an iodide salt. The reaction is conveniently carried out by bringing the reactants together in a solvent such as an alcohol, ketone, ether, and the like. Typical examples of such solvents include methanol, ethanol, propanol, methyl butyl ether, ethyl ether, acetone and methyl ethyl ketone. The reaction is preferably carried out at a temperature within the range of 25° C. to 100° C. and is usually complete in one-half to two hours. The product is conveniently separated from the reaction mixture by the addition of a non-solvent such as water thereby precipitating the desired retrocortin 21-iodo compound as, for example, 21-iodo-retrocortin, 21-iodo-hydro-retrocortin, 9-fluoro-21-iodo retrocortin, 9-fluoro-21-iodo-hydro-retrocortin, and the like.

The 21-iodo retrocortin compounds are converted to the corresponding 21-desoxy retrocortin compound by reaction with a reducing agent, as for example, hydrogen in the presence of a hydrogenation catalyst such as platinum, nickel, palladium, and oxides of these metals, chromous chloride, and the like. When hydrogen is used as the reducing agent, the hydrogenation reaction is ordinarily conducted in a solvent such as an alcohol, for example, ethanol, methanol or propanol. The reaction is carried out at a temperature within the range of 0° C. to 100° C., preferably at room temperature, until two mols of hydrogen are taken up. The hydrogenation product is recovered by diluting the reaction mixture with water, filtering, and extracting with a solvent to remove impurities, and evaporating the aqueous solution to dryness, thereby giving the desired 21-desoxy retrocortin compound. Alternatively, the 21-iodo-retrocortin compound is reacted, in an organic solvent, such as acetone with aqueous chromous chloride. The reaction is preferably conducted under a carbon dioxide atmosphere while maintaining the reaction mixture at substantially room temperature. The product is conveniently recovered by diluting the reaction mixture with water, extracting the product from the aqueous mixture with chloroform. The chloroform extracts are washed with water, aqueous sodium bicarbonate solution, dried, and the chloroform evaporated to give the 21-desoxy-retrocortin compound such as 21-desoxy-retrocortin, 21-desoxy-hydro-retrocortin, 21-desoxy-9-halo-retrocortin, 21-desoxy-9-fluoro-retrocortin, 21-desoxy-9-halo-hydro-retrocortin, 21-desoxy-9-fluoro-hydroretrocortin, and the like.

The following examples illustrate methods in carrying out the present invention, but it is to be understood that these examples are given for purposes of illustration and not of limitation.

Example 1

A mixture of 3.5 parts of retrocortin in 24 parts of pyridine is cooled to 0° C. To the cooled mixture is added 14 parts of methane sulfonyl chloride, and the resulting mixture is maintained at 0° C. for three hours. The reaction mixture is then poured into ice water whereupon the product separates as a solid, which is recovered by filtration, dried and recrystallized from acetone to give substantially pure retrocortin 21-methane sulfonate.

Example 2

A mixture of 1.5 parts of retrocortin 21-methane sulfonate, 1.1 parts of sodium iodide and 140 parts of ethanol are heated under reflux for approximately 30 minutes. The entire reaction mixture is filtered, and the filtered solution is evaporated in vacuo to about 100 parts. To this concentrated solution are added 100 parts of water, and the aqueous mixture thus obtained is evaporated to give approximately 150 parts of an aqueous suspension. This suspension is filtered, and the solid material is washed with water and dried to give 21-iodo-retrocortin.

*Example 3*

A solution of 0.5 part of 21-iodo retrocortin in 100 parts of ethanol is hydrogenated at 25° C. at atmospheric pressure in the presence of about 0.5 part of pre-reduced palladium oxide catalyst. When hydrogenation is complete, as determined by the quantity of hydrogen (2 mols) taken up, the reaction mixture is filtered to remove the catalyst and the filtrate, which contains the 21-iodo retrocortin, is evaporated in vacuo, and the residual material chromatographed over activated alumina and recrystallized from acetone-petroleum ether to give substantially pure 21-desoxy-retrocortin.

The retrocortin utilized as starting material in the foregoing example can be prepared as follows: a solution containing 39.6 g. of bromine in 300 cc. of acetic acid is added to a solution containing 100 g. of 3,11,20-triketo-17$\alpha$-hydroxy - 21 - acetoxy-pregnane dissolved in 1500 cc. of acetic acid. When the reaction is substantially complete, the solution is immediately poured into water, and the resulting suspension is extracted with chloroform. The chloroform extract is washed with water, evaporated to dryness, and the residual material crystallized from acetone-ether to give as a substantially pure crystalline product the 4-bromo-3,11,20-triketo-17$\alpha$-hydroxy-21-acetoxy-pregnane.

The mother liquor from this crystallization procedure is dissolved in benzene and chromatographed over acid-washed alumina, and the chromatogram eluted with mixtures of ether and chloroform. The eluate is evaporated to dryness, and the residual crystalline material is recrystallized from ethyl acetate to give 2-bromo-3,11,20-triketo-17$\alpha$-hydroxy-21-acetoxy-pregnane. A solution of 300 mg. of this 2-bromo-3,11,20-triketo-17$\alpha$-hydroxy-21-acetoxy-pregnane in 5 ml. of collidine is heated for one hour under reflux, and the collidine is evaporated in vacuo. The residual material is dissolved in chloroform, and the chloroform extract is washed with dilute aqueous hydrochloric acid, then with water, dried and evaporated in vacuo to dryness. The residual material is recrystallized from ethyl acetate to give substantially pure $\Delta^1$-3,11,20-triketo - 17$\alpha$ - hydroxy - 21 - acetoxy-pregnene; M.P. 244–246° C.

Four hundred milligrams of $\Delta^1$-3,11,20-triketo-17$\alpha$-hydroxy-21-acetoxy-pregnene is dissolved in 50 cc. of glacial acetic acid containing three drops of 30% hydrobromic acid in glacial acetic acid, and to the stirred solution is added a solution containing 0.61 ml. bromine (190 mg.) in 5 ml. of glacial acetic acid over a ten minute period. Five minutes after the addition of bromine is completed, the reaction mixture is poured into 400 ml. of ice water, and the aqueous mixture is extracted three times with chloroform. The chloroform extracts are combined, washed with aqueous sodium bicarbonate solution, then with water, dried and evaporated to dryness in vacuo to give $\Delta^1$-4-bromo-3,11,20-triketo-17$\alpha$-hydroxy-21-acetoxy-pregnene.

Five hundred milligrams of $\Delta^1$-4-bromo-3,11,20-triketo-17$\alpha$-hydroxy-21-acetoxy-pregnene is heated under reflux with 10 ml. of collidine for one hour; the reaction mixture is cooled and, with stirring, is treated with 35 ml. of a 2 N aqueous solution of sulfuric acid. The aqueous mixture is extracted three times with chloroform, and the combined chloroform extracts are dried and the chloroform evaporated therefrom in vacuo. The residual material is dissolved in benzene and chromatographed over 15 g. of acid-washed alumina. The chromatogram is eluted with mixtures of ether and chloroform, and the combined eluates are evaporated to dryness. The residual crystalline material is recrystallized from ethyl acetate to give substantially pure retrocortin 21-acetate ($\Delta^{1,4}$-3,11,20 - triketo - 17$\alpha$ - hydroxy-21-acetoxy-pregnadiene); M.P. 226–228° C.

One hundred milligrams of retrocortin 21-acetate is dissolved in a mixture of 1.0 cc. of benzene and 1.0 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give substantially pure retrocortin ($\Delta^{1,4}$-3,11,20-triketo-17$\alpha$,21-dihydroxy-pregnadiene); M.P. 207–214° C.

*Example 4*

21-desoxy-hydro-retrocortin is prepared utilizing the procedure of Examples 1 to 3, but using hydro-retrocortin as the starting material in place of the retrocortin utilized in Example 1.

The hydro-retrocortin used in this example is prepared as follows: a solution containing 39.6 g. of bromine in 300 cc. of acetic acid is added to a solution containing 100 g. of 3,20 - diketo - 11$\beta$,17$\alpha$ - dihydroxy - 21 - acetoxy-pregnane dissolved in 1500 cc. of acetic acid. When the reaction is substantially complete, the solution is immediately poured into water, and the resulting suspension is extracted with chloroform. The chloroform extract is washed with water, evaporated to dryness, and the residual material crystallized from acetone-ether to give as a substantially pure crystalline product the 4 - bromo - 3,20 - diketo - 11$\beta$,17$\alpha$ - dihydroxy - 21 - acetoxy-pregnane.

The mother liquor from this crystallization procedure is dissolved in benzene and chromatographed over acid-washed alumina, and the chromatogram eluted with mixtures of ether and chloroform. The eluate is evaporated to dryness, and the residual crystalline material is recrystallized from ethyl acetate to give 2-bromo-3,20-diketo - 11$\beta$,17$\alpha$ - dihydroxy - 21 - acetoxy - pregnane. A solution of 300 mg. of this 2-bromo-3,20-diketo-11$\beta$,17$\alpha$-dihydroxy-21-acetoxy-pregnane in 5 ml. of collidine is heated for one hour under reflux, and the collidine is evaporated in vacuo. The residual material is dissolved in chloroform, and the chloroform extract is washed with dilute aqueous hydrochloric acid, then with water, dried and evaporated in vacuo to dryness. The residual material is recrystallized from ethyl acetate to give substantially pure $\Delta^1$ - 3,20 - diketo - 11$\beta$,17$\alpha$ - dihydroxy-21-acetoxy-pregnene; M.P. 244–246° C.

Four hundred milligrams of $\Delta^1$-3,20-diketo-11$\beta$,17$\alpha$-dihydroxy-21-acetoxy-pregnene is dissolved in 50 cc. of glacial acetic acid containnig three drops of 30% hydrobromic acid in glacial acetic acid, and to the stirred solution is added a solution containing 0.061 ml. bromine (190 mg.) in 5 ml. of glacial acetic acid over a ten minute period. Five minutes after the addition of bromine is completed, the reaction mixture is poured into 400 ml. of ice water, and the aqueous mixture is extracted three times with chloroform. The chloroform extracts are combined, washed with aqueous sodium bicarbonate solution, then with water, dried and evaporated to dryness in vacuo to give $\Delta^1$-4-bromo-3,20-diketo-11$\beta$,17$\alpha$-dihydroxy-21-acetoxy-pregnene.

Five hundred milligrams of $\Delta^1$-4-bromo-3,20-diketo-11$\beta$,17$\alpha$-dihydroxy-21-acetoxy-pregnene is heated under reflux with 10 ml. of collidine for one hour; the reaction mixture is cooled and, with stirring, is treated with 35 ml. of a 2 N aqueous solution of sulfuric acid. The aqueous mixture is extracted three times with chloroform, and the combined chloroform extracts are dried and the chloroform evaporated therefrom in vacuo. The residual material is dissolved in benzene and chromatographed over 15 g. of acid-washed alumina. The chromatogram is eluted with mixtures of ether and chloroform, and the combined eluates are evaporated to dryness. The residual crystalline material is recrystallized from ethyl acetate to give substantially pure retrocortin 21-acetate ($\Delta^{1,4}$-3,20-diketo-11$\beta$,17$\alpha$-dihydroxy-21 acetoxy-pregnadiene); M.P. 226–228° C.

One hundred milligrams of hydro-retrocortin 21-acetate is dissolved in a mixture of 1.0 cc. of benzene and 1.0 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give substantially pure hydro-retrocortin ($\Delta^{1,4}$-3,20 - diketo - 11$\beta$,17$\alpha$,21 - trihydroxy - pregnadiene); M.P. 207–214° C.

*Example 5*

9-fluoro-21-desoxy-retrocortin is prepared utilizing the procedure of Examples 1 to 3, but using 9-fluoro-retrocortin as the starting material in place of the retrocortin utilized in Example 1.

*Example 6*

9-fluoro-2-desoxy-hydro-retrocortin is prepared utilizing the procedure of Examples 1 to 3, but using 9-fluoro-hydro-retrocortin as the starting material in place of the retrocortin utilized in Example 1.

The 9 - fluoro - retrocortin ($\Delta^{1,4}$ - 9$\alpha$ - fluoro - 3,11,20 - triketo - 17$\alpha$,21 - dihydroxy - pregnadiene) and the 9 - fluoro - hydro - retrocortin ($\Delta^{1,4}$ - 9$\alpha$ - fluoro - 3,20-diketo - 11$\beta$,17$\alpha$,21 - trihydroxy - pregnadiene) used as starting materials in Examples 5 and 6 may be prepared in accordance with the procedures described hereinabove for preparing retrocortin and hydro-retrocortin but using as starting materials, instead of the 3,11,20-triketo-17$\alpha$-hydroxy - 21 - acetoxy - pregnane and 3,20 - diketo-11$\beta$,17$\alpha$ - dihydroxy - 21 - acetoxy - pregnane used in those procedures, 9$\alpha$ - fluoro - 3,11,20 - triketo - 17$\alpha$-hydroxy - 21 - acetoxy - pregnane and 9$\alpha$ - fluoro - 3,20-diketo - 11$\beta$,17$\alpha$ - dihydroxy - 21 - acetoxy - pregnane, respectively.

Various changes and modifications may be made in carrying out the present invention without departing from the spirit and scope thereof. Insofar as these changes and modifications are within the purview of the annexed claims, they are to be considered as part of this invention.

I claim:

1. A 9$\alpha$-fluoro-17$\alpha$-hydroxy-1,4-pregnadiene-3,20-dione of the formula 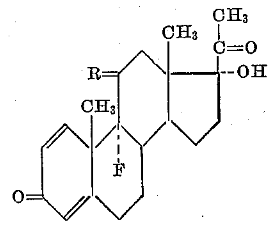 wherein R is a member of the class consisting of =O and 2. 9$\alpha$ - fluoro - 17$\alpha$ - hydroxy - 1,4 - pregnadiene - 3,11,20-trione.

3. 9$\alpha$ - fluoro - 11,17$\alpha$ - dihydroxy - 1,4 - pregnadiene-3,20-dione.

References Cited in the file of this patent

UNITED STATES PATENTS

| | | |
|---|---|---|
| 2,303,498 | Reichstein | Dec. 1, 1942 |
| 2,357,224 | Reichstein | Aug. 29, 1944 |
| 2,579,479 | Djerassi | Dec. 25, 1951 |
| 2,596,563 | Kaufmann | May 13, 1952 |
| 2,684,968 | Bergstrom | July 27, 1954 |
| 2,713,587 | Bergstrom | July 19, 1955 |
| 2,734,065 | Hogg | Feb. 7, 1956 |
| 2,756,179 | Fried | July 24, 1956 |
| 2,763,671 | Fried | Sept. 18, 1956 |
| 2,767,199 | Djerassi | Oct. 16, 1956 |
| 2,768,189 | Nomine | Oct. 23, 1956 |